Figure 1:
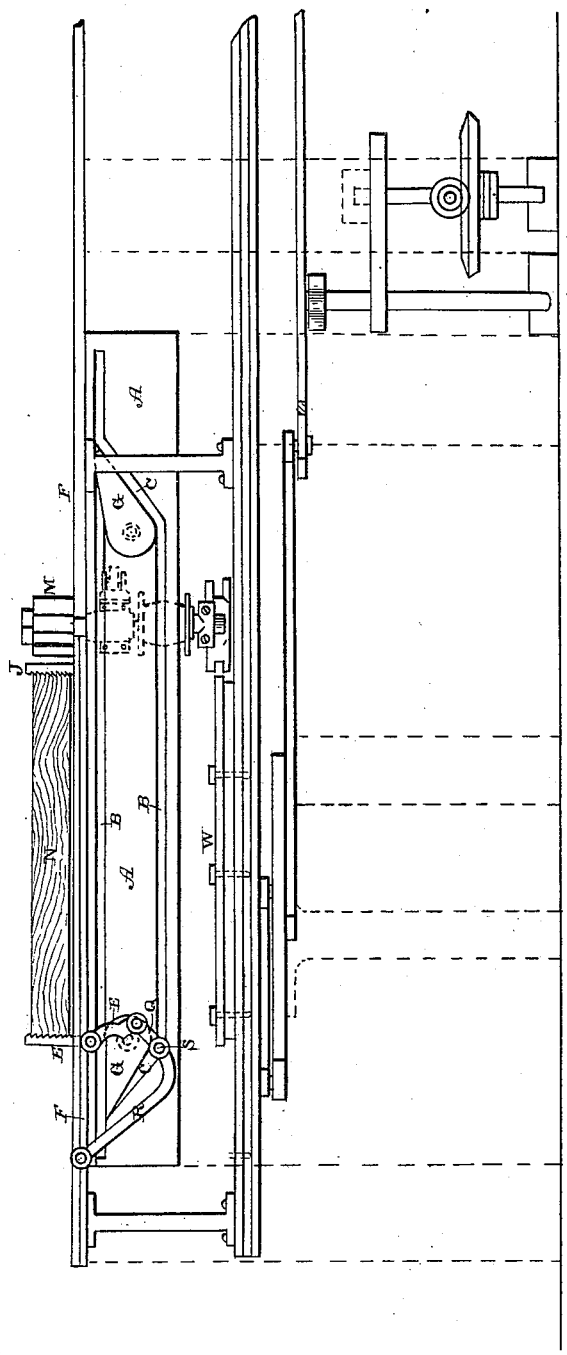

(No Model.) 3 Sheets—Sheet 1.

C. L. GOEHRING.
WOOD MOLDING AND STAVE MACHINE.

No. 356,066. Patented Jan. 11, 1887.

Witnesses

Inventor
C. L. Goehring
By J. A. Lehmann
Attorney (No Model.) 3 Sheets—Sheet 2.

C. L. GOEHRING.
WOOD MOLDING AND STAVE MACHINE.

No. 356,066. Patented Jan. 11, 1887.

Witnesses
Wm J Pannel
A. W. Brecht

Inventor
C. L. Goehring
By J. A. Lehmann,
Attorney (No Model.) 3 Sheets—Sheet 3.

C. L. GOEHRING.
WOOD MOLDING AND STAVE MACHINE.

No. 356,066. Patented Jan. 11, 1887.

Witnesses

Inventor
C. L. Goehring.
By J. A. Lehmann,
Attorney

UNITED STATES PATENT OFFICE.

CHARLES L. GOEHRING, OF ALLEGHENY, PENNSYLVANIA.

WOOD-MOLDING AND STAVE MACHINE.

SPECIFICATION forming part of Letters Patent No. 356,066, dated January 11, 1887.

Application filed September 25, 1886. Serial No. 214,509. (No model.)

*To all whom it may concern:*

Be it known that I, CHARLES L. GOEHRING, of Allegheny, in the county of Allegheny and State of Pennsylvania, have invented certain new and useful Improvements in Wood-Molding and Stave Machines; and I do hereby declare the following to be a full, clear, and exact description of the invention, such as will enable others skilled in the art to which it pertains to make and use it, reference being had to the accompanying drawings, which form part of this specification.

My invention relates to an improvement in wood-molding and stave machines; and it consists in, first, an automatically-acting dog, which grasps the stave or other lumber that is being dressed upon the end as the stave or piece of lumber stands upon its edge, and which dog holds the stave or other piece of lumber against a second spring-actuated dog at the other end until the stave or other piece of lumber has passed entirely through between the cutters, and a slight distance beyond, when this automatically-acting dog closes downward below the surface of the table, and remains in that position until the sliding table is returned to its former position to receive another stave to be dressed; second, a vertical hanger, which is provided with suitable grooves in its face, and which is secured stationary to the under side of the table, with automatically-acting switches and the automatically-acting dog for grasping one end of the stave or other piece of lumber which is to be dressed; third, in the arrangement and combination of devices, which will be more fully described hereinafter.

The object of my invention is to produce a molding-machine for dressing staves and other pieces of lumber upon both sides or edges at the same time, and giving the sides either the same or different shapes, as may be desired, and in which the staves or other pieces of lumber to be dressed are held by two dogs while they pass between the cutters, one of which dogs automatically grasps the end of the stave and forces it against a second dog, and then after the stave has been dressed this automatically-acting dog sinks below the level of the table until it is returned to its former position.

Figure 2:
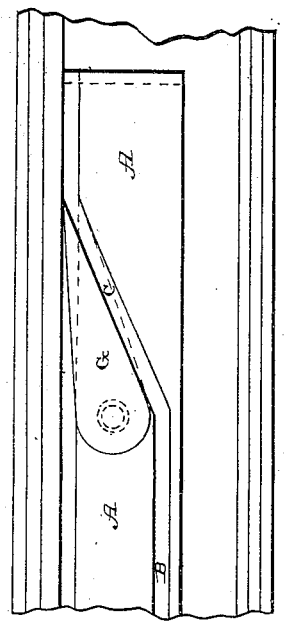
Figure 4:
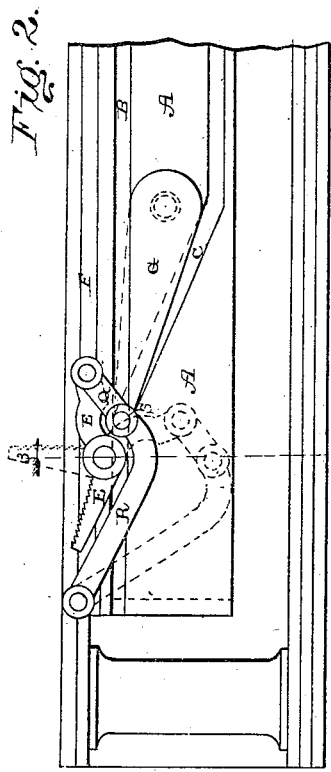
Figure 4:
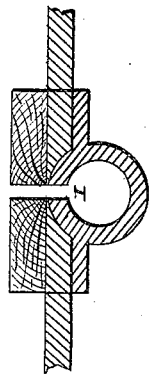
Figure 5:
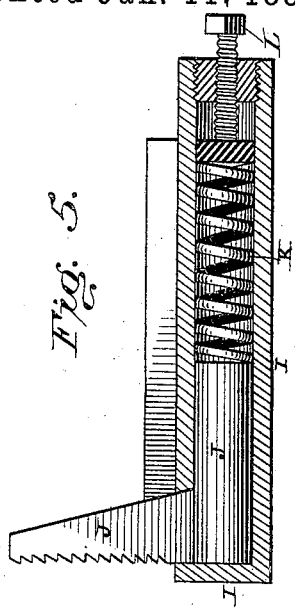
Figure 3:
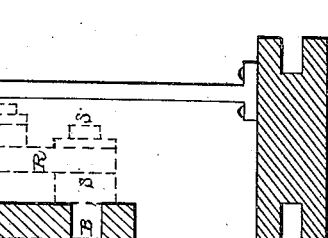
Figure 6:
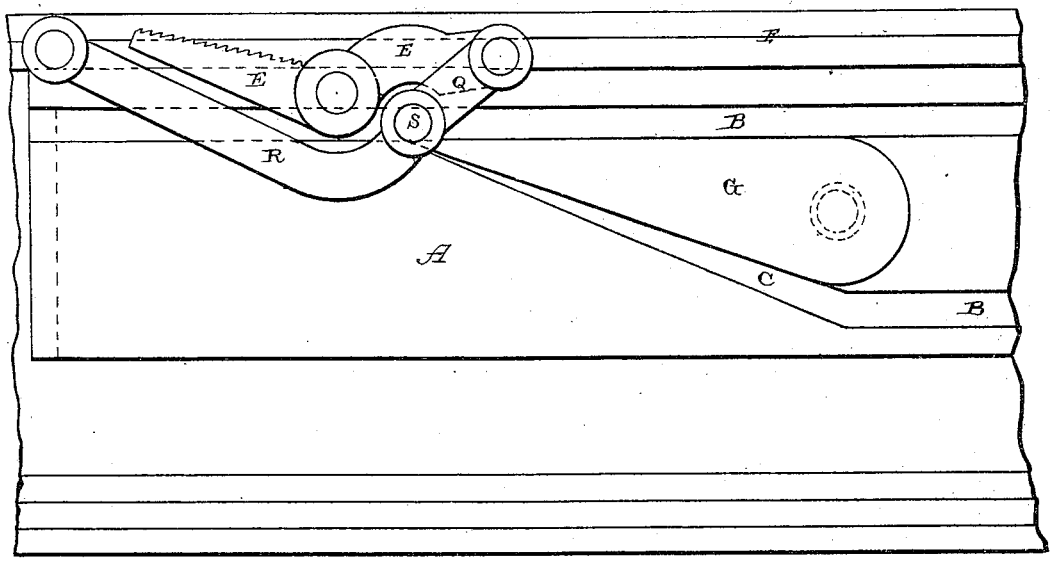
Figure 7:
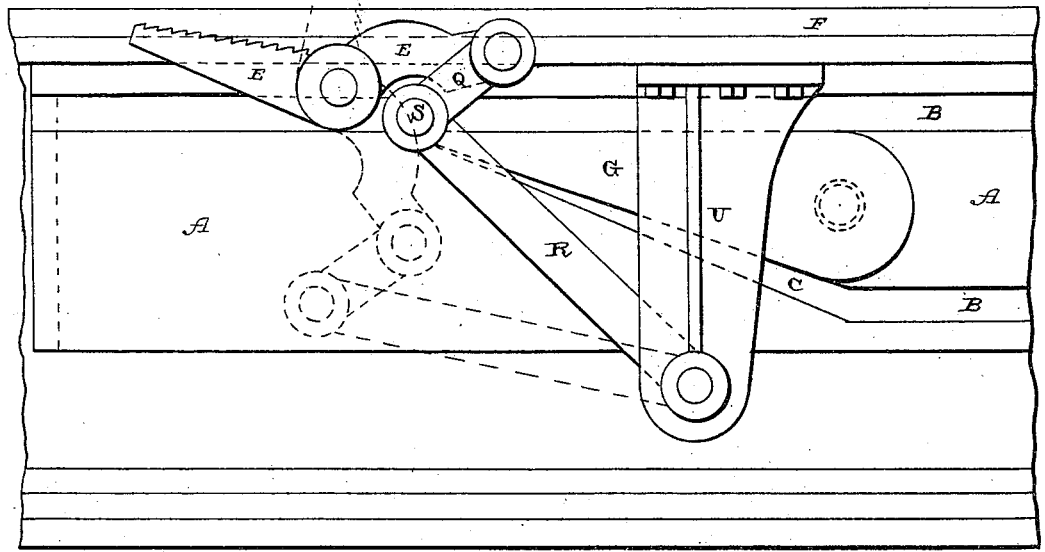

Figure 1 is a longitudinal vertical section of a molding and stave machine to which my invention is applied. Figs. 2 and 6 are enlarged detail views of the automatically-acting dog. Fig. 3 is a vertical section taken through the automatically-acting dog. Figs. 4 and 5 are detail views of the stationary spring-actuated dog. Fig. 7 is an enlarged view of the automatically-acting dog, shown in connection with the pushing-lever, in contradistinction to a pulling one, as shown in Figs. 2 and 5.

So far as the cutters, the mechanism for operating them, the movable table upon which the undressed stave to be dressed is placed, the pattern, and the mechanism for moving the stave or piece of lumber slowly forward between the cutters and then rapidly backward are concerned, no claim is here made to any novelty, as all of these features are fully shown, described, and claimed in the two applications, bearing Serial Nos. 209,850 and 205,571, which I now have in the Patent Office.

The special feature of improvement in this application consists in the manner and the devices for operating the dogs by means of which the staves being dressed are seized and held while being passed between the cutters.

Rigidly secured to the under side of the top of the table is the cam-board or hanger A, which is provided with the two horizontal parallel grooves B and the two inclined grooves C, which extend in opposite directions. The four grooves are connected together, so as to form a continuous groove, as shown, and in these grooves moves or slides the pivotal pin S, by means of which the automatically-acting dog E is operated. In order to change this pin S from one groove to another as it is carried back and forth by the sliding table F, upon which the undressed stave is placed to be dressed, the two spring-actuated automatically-acting switches G are used, and these switches are placed at the junction of the horizontal grooves with the two inclined ones C.

While one switch is held forced upward, as shown in Fig. 2, by the spring H, which is applied to it, as shown in Fig. 3, the other switch is held forced downward against the lower side of the inclined groove.

Secured to the inner end of the sliding table, at any suitable point, is the tubular stationary frame I, in which is placed the spring-actuated dog J. This dog is held in position in the end of its slotted frame I by means of the spring K, which bears against its rear end, and which spring has its pressure upon the dog regulated by means of the set-screw L, as shown in Fig. 5. Any desired degree of pressure can be given to this spring, so as to allow the dog J to give before the end of the stave or piece of lumber that is being dressed to any desired extent. This dog J, when the sliding table has moved forward to receive a stave, passes in between and just beyond the cutters, as shown in Fig. 1, so as to be ready to receive a new piece of lumber or stave. This dog always projects above the top of the table, and, being very narrow, moves back and forth between the cutters M at every movement of the table. The other dog, E, by which the opposite end of the stave which is being dressed is held, is automatic in its operation, and hence only projects vertically above the table while the table is carrying forward the stave or piece of lumber between the cutters, and then this dog E assumes the position shown in solid lines in Figs. 2 and 6 while the table is being moved backward, and then the dog E rises vertically just in time to clamp another undressed stave, which has been placed edgewise upon the table for the purpose of being dressed. This dog E is journaled upon the pin or bolt O, which passes through a suitable casting, P, which is rigidly secured to the under side of the table F, and then the dog rises and falls through the slot made in the table F, as shown in Fig. 3. The object of this automatic dog E is to rigidly clamp the stave, N, which is being dressed against the other dog, J, and thus hold the stave in position while it is passing between the two cutters. All that the operator has to do is to place the stave N in position, with one end bearing against the dog J, and then the dog E rises and catches the other end, so as to rigidly hold it. While the table is moved back the dog E occupies the position shown in Figs. 2, 3, 6, and 7, so as to be entirely out of the way and allow the stave to be placed freely in position. Connected to the lower end of this dog E is a link, Q, and to the opposite end of the link is fastened the lever R by means of the pin S, as shown in Fig. 3. The upper end of this lever R is secured to the table F, and has its lower end guided in its movements by means of the pin, stud, or projection S, which moves in the four grooves formed in the vertical hanger A. As long as this pin S is in the upper horizontal groove B, as shown in solid lines in Figs. 2 and 6, the lower end of the dog E is thrown upward, and its upper end is turned backward, so as to release the stave N. While the sliding table is moving backward to receive another stave to be dressed, this pin S moves in the upper horizontal groove B, and the movement of the table carries this pin beyond the switch near that end of the groove. As the pin reaches the switch, the switch closes down, as shown in Fig. 2 in dotted lines, so as to allow the pin to pass, and then the spring H upon the same switch causes it to snap up into position, as shown in solid lines, so as to deflect the pin S into the inclined groove C. As soon as the pin S passes this inclined groove C, the dog E begins to rise, because its lower end is being drawn downward by the link Q and lever R, and when the pin S reaches the lower horizontal slot B the dog is in the vertical position shown in Fig. 1 and has grasped the end of the stave N, and retains it in that position as long as the pin S is moving in the lower horizontal groove. When the pin reaches the inclined groove C at the opposite end, the end of the lever R begins to rise upward, and thus forces the lower end of the dog E upward at the same time, and this upward movement continues until the pin S passes the spring-actuated switch at that end, when the switch snaps back into the position shown in solid lines. While the pin S is moving in the lower horizontal groove B it is held so rigidly that the lever R can neither give backward nor forward, and hence the dog E is as rigidly held as though it formed a portion of the lever R itself. The amount of pressure which can be applied through the dog E to the end of the stave can be regulated by the spring K and set-screw L of the stationary dog J.

As shown in Figs. 1, 2, 3, and 6, the lever R is made to draw or pull the dog E up into a vertical position; but, should it be so desired, this dog may be pushed into position instead of pulled. As shown in Fig. 7, the lever R is pivoted at its lower end to the hanger U, which is secured to the under side of the sliding table F, and then as the table moves forward the pin S is pushed along through the lower groove B instead of being pulled. In both cases the operation is the same in result.

By having an automatic dog to thus grasp the ends of the staves, the staves are dressed upon both sides at the same time, and given any desired shape, and the rollers, which are shown in my other applications, now pending, for holding the staves down upon the table, may either be entirely dispensed with or used in connection with the dogs for holding the staves while being dressed on the edges, as may be desired. The rollers are not needed where the stave is held upon its edge, as shown in Fig. 1; but where the staves are laid flat upon the movable table for the purpose of having their edges dressed then the rollers may either be used alone or used in connection with this automatic-acting dog for holding the staves upon the table, as may be desired.

As the cutters M are to be moved to and fro in relation to each other by means of a pattern, as described in my other applications, the staves are dressed upon both sides and given any desired shape. The staves, when finished, will be of a certain thickness at the end, while they may be thinner at the center, so as to add strength to the ends of the staves where the chines are made, giving thickness at the center so as to allow easy bending of the staves, so as to conform to the shape of the cask or barrel that is being made.

The machine here shown is specially intended to make staves for beer-barrels, hogsheads, ordinary barrels, oil-barrels, casks, and tanks of all kinds.

Having thus described my invention, I claim—

1. The combination of the stationary frame or table, having a lengthwise opening through its top to receive the sliding table, the sliding slotted table upon which the stave is placed to be dressed, with the stationary dog which grasps one end of the stave, and an automatically-operating dog which rises through the slot in the sliding table, and a mechanism for operating it as the table is moved back and forth, whereby the dog is made to automatically rise through the slot in the sliding table and grasp the end of the stave and hold it until the stave is dressed upon both sides, and then sinks back below the level of the table while the table is being moved back to receive another stave, substantially as shown.

2. The combination of the stationary frame or table, having a lengthwise opening through its top to receive the sliding table, the grooved hanger which is rigidly secured to its under side and operates the movable dog, the sliding slotted table which receives the stave which is to be dressed, and a mechanism for moving it, with the stationary dog against which one end of the stave is pressed, and the pivoted automatically-acting dog and a mechanism for operating it, whereby the automatically-acting dog remains in a vertical position, holding the stave while it is being passed between the cutters, and then sinks back through the slot below the level of the table, substantially as described.

3. The combination of the stationary frame, the grooved hanger which is rigidly secured to its under side, the sliding table which carries the stave to be dressed between the cutters, the cutters which dress opposite sides of the stave, the stationary dog against which one end of the stave is pressed, the automatic pivoted dog, connecting-link, and the lever for operating the dog, the lever being pivoted to the sliding table at its upper end, and having its lower end operated by means of a pin or projection which catches in the grooves in the grooved hanger, substantially as set forth.

4. The combination of the stationary frame, the grooved hanger A, which is rigidly secured to the under side of the frame and which is provided with the four slots B C, the spring-actuated switches G, placed near opposite ends of the grooves, the sliding table upon which the stave to be dressed is placed, the stationary dog against which one end of the stave is pressed, the automatically-acting dog, a connecting-rod, $q$, connected to its lower end, the lever R, by means of which the automatically-acting dog is operated, the pin or projection for catching in the grooves, and the cutters by which the stave is dressed upon both sides at once, substantially as specified.

In testimony whereof I affix my signature in presence of two witnesses.

C. L. GOEHRING.

Witnesses:
A. W. BRECHT,
M. A. BALLINGER.